Sept. 2, 1924. 1,507,162
H. DIERNHOFER
PHOTOGRAPHIC APPARATUS FOR MAKING HELIOCHROMES
Filed April 20, 1922 2 Sheets-Sheet 2
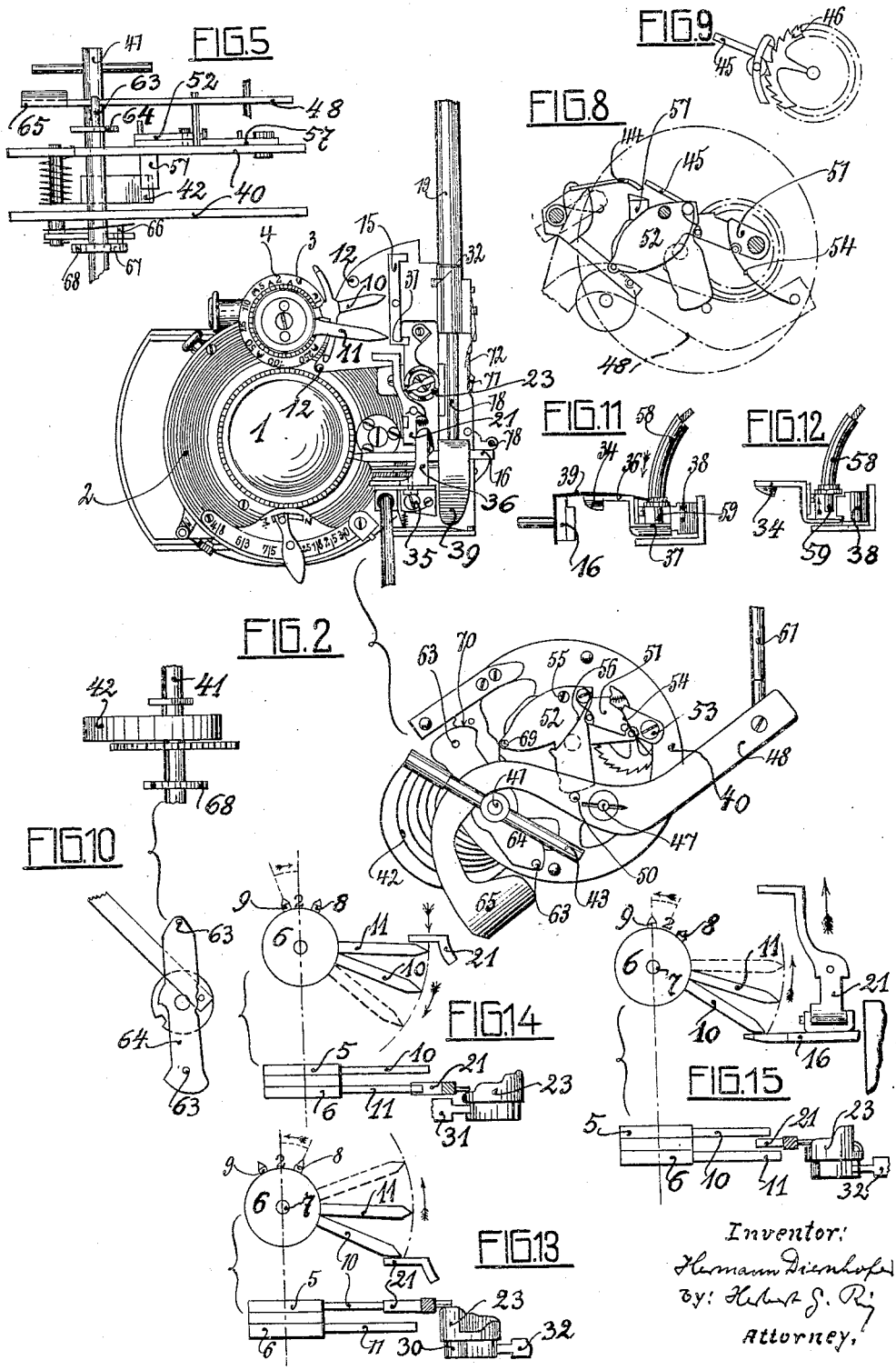
Inventor:
Hermann Diernhofer
By: Hubert G. Ry
Attorney.

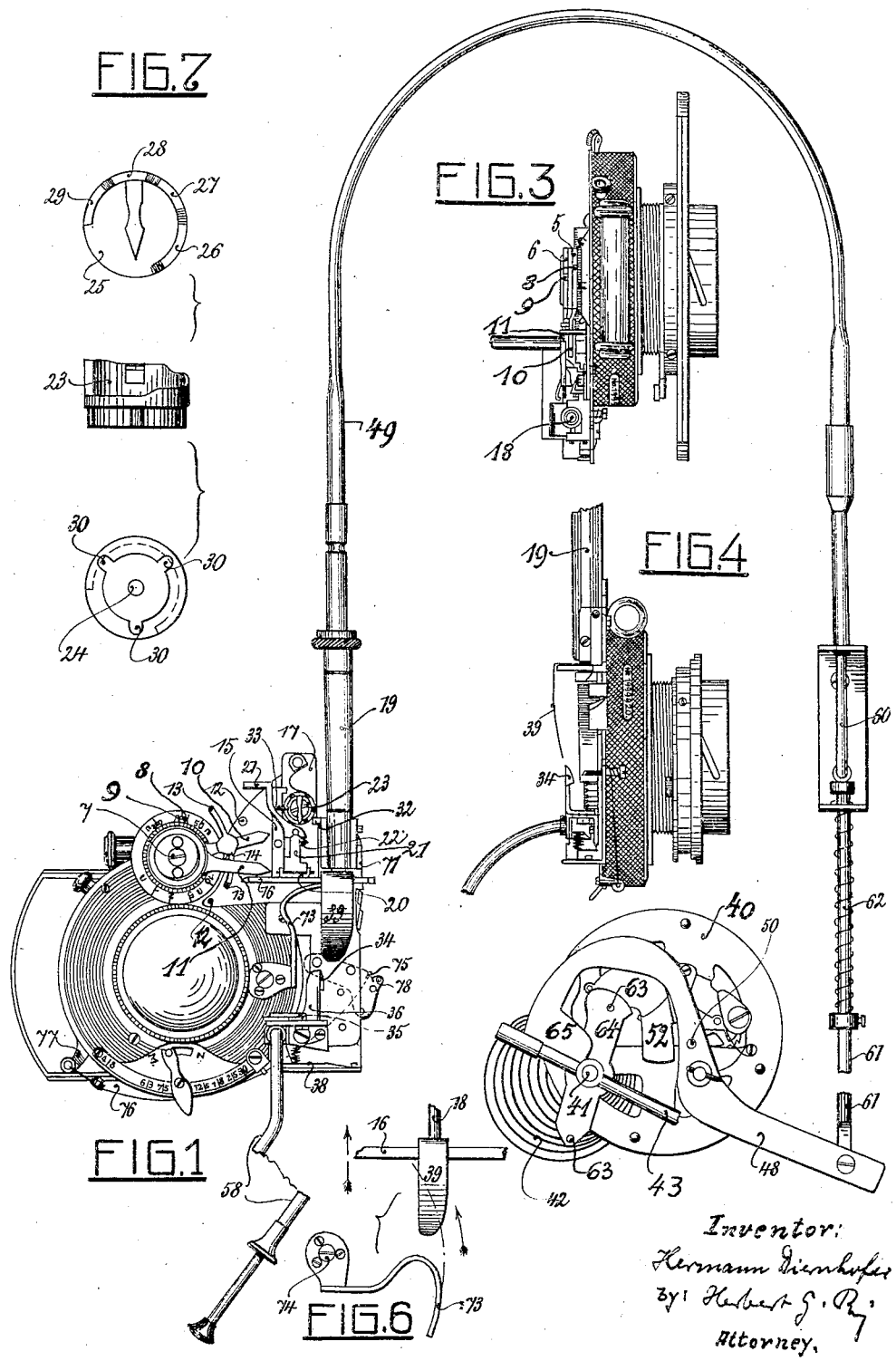

Patented Sept. 2, 1924.

1,507,162

UNITED STATES PATENT OFFICE.

HERMANN DIERNHOFER, OF ZITTAU, GERMANY.

PHOTOGRAPHIC APPARATUS FOR MAKING HELIOCHROMES.

Application filed April 20, 1922. Serial No. 555,687.

*To all whom it may concern:*

Be it known that I, HERMANN DIERNHOFER, a citizen of the German Republic, and a resident of Zittau, Germany, have invented a certain new and useful Improved Photographic Apparatus for Making Heliochromes, of which the following is a specification.

This invention relates in general to a photographic apparatus for making heliochromes, or photographs in natural colors respectively, and in particular to a shutting device for that apparatus.

Making photographs in natural colors is generally effected with aid of several, as a rule three, color-filters through which a corresponding number of exposures of the object to be photographed is made upon photographic plates or films in as short intervals as possible. The density of said filters may be such that every part-exposure requires another exposure-time. Of late, however, the filters are rendered concordant with the exposure plates in such a manner that, if the light is normal, the exposure times for the three part-images may be equally long. But in spite of this possibility it may become requisite to make the part-exposures in different exposure-times, if, owing to certain circumstances as regards the time of the day or the location of the object to be photographed, the one or the other principal color is more or less in excess. Thus, for instance, the blue tint prevails in a foggy morning landscape; the red tint prevails at sunset, and the green tint prevails in a forest-landscape or a meadow-landscape. Therefore, to obtain an image actually true to nature, the just-mentioned circumstance must be paid attention to and corrected by more or less reducing the time of exposure with a color filter, the color of which just prevails in the object in view.

With the apparatus as hitherto constructed, for making heliochromes, the three part-exposures and the exchanging of the plates and the filters were effected in this way that one hand of the operator had to make the exposures and the other the exchanges. If the circumstances as regards the tints of the object necessitated different lengths of the three exposures, the requirements as to the attention of the operator were greater than consistent with a proper success. Also with apparatus having shutters with adjustable exposure-times the necessity of adjusting the proper exposure time before each exposure could not be obviated. In no case was it possible, on the one side to effect the three exposures and the exchanges quickly enough, and on the other side (if the part-exposures should be carried through in the exact times apt for the case) to abstract one's attention from that exposing and exchanging work. There remained not one moment for the important observation of the object to be photographed, because directing the attention to another matter than the exposing and the exchanging in question entailed in every case errors in the times of exposure.

Now, in contradistinction to the known apparatus above briefly treated, the present invention relates to a photographic apparatus which permits of a very exact adjustment of the exposure-times for the single part-images before the exposures are made, and which then automatically adjusts itself, before a part-exposure is made, to the appertaining exposure-time and which, furthermore, releases the exchange-mechanisms after that part-exposure, and which, finally, actuates the shutter after that exchange has taken place and as a preparation for the next part-exposure, the various operations following each other automatically in the proper succession, as just enumerated. There is, thus, fulfilled the task to enable the operator to concentrate the whole of his thinking and attention to the object to be photographed because his exposing and exchanging work need consist merely in one pressure upon the releasing device. The exposing and exchanging operations, inclusive the mutual releasing of the respective mechanisms, occur and follow each other, automatically, so that the shortest possible total exposure time of all part-exposures is warranted, because not even a fraction of a second gets lost.

The effect in view is attained, according to the present invention, by providing for each color filter and, thus for each part-exposure a special shutter adjusting disk, further by arranging these disks one upon the other and, furthermore, making them singly rotatable, as well as rotatable in common; and, finally, by providing means by which, after the first or one exposure has been made at a certain position of the adjusting disk concerned the second or next adjusting disk is automatically turned into proper position for the second or next exposure, and so on. This automatic rotation of the second and the third, etc., adjusting disk is effected by a slide-like adjusting device arranged upon the objective plate and being moved upwards and downwards during each individual exposure and either taking with it the one or the other of the adjusting disks, as the case may be, or leaving it behind, just as required; the upward motion of said adjusting device is effected by a spring the downward motion by a clockwork which serves for the automatic exchange of the cassettes, as is all fully described hereinafter in connection with the figures of the drawings.

In order to make my invention more clear, I refer to the accompanying drawings, in which, by way of example, an apparatus for three-color exposures is illustrated, and in which similar numbers of reference denote similar parts throughout the several views. Fig. 1 is a front-view of the apparatus in its position of rest. Fig. 2 is a similar view showing the apparatus prepared for use. Fig. 3 is a plan of it. Fig. 4 is a side-view of the objective, the position of this latter corresponding to Fig. 1. Fig. 5 is a plan of the clockwork. Figs. 6–15 show various details which are singly referred to in the further course of this specification.

1 is the lens and 2 the objective plate of the object part of the photographic camera, the other parts of which have not been illustrated because they are known and do not form parts of this invention. The object plate 2 has the usual adjusting disk 3 for regulating the times of adjustable time-exposures and of momentary or instantaneous exposures, the adjustment of this disk being effected with aid of a notch 4 provided in a cavity of the object plate 2. Upon the normal adjusting disk is a second adjusting disk 5 and upon this a third adjusting disk 6. The three disks 3, 5, 6 are supported upon a common axle 7, but they are also singly rotatable if a certain friction then arising between two neighbouring disks is overcome. Each of the additional adjusting disks 5 and 6 has a hand 8, or 9 respectively, and a lateral arm 10, or 11 respectively, by means of which the respective disk may be turned for a certain angle. The extent of motion of the arms 10 and 11 may be limited to a certain measure by two abutments 12, whereas the mutual angular moveability of the arms is limited by projections 13 of a bow 14 which is connected with the lower hand 10.

Upon the object plate 2 is provided, at the side of the adjusting disks 3, 5, 6, a guide 15 in which a slide 17 having a horizontal ledge 16 at its lower end may be vertically reciprocated. To the ledge 16 is attached a guide rod 18 which glides in a sleeve 19 and is subjected to the action of a spiral spring located in that sleeve. The spring tends constantly to draw the rod 18 with the slide 17 upwards. A lever 21 is supported in a small bearing 20 attached to the slide 17 and so arranged as to be movable in a plane which lies at right angles to the plane of the object plate 2. A spring 22 tends constantly to press that lever downwards, that is to say, in the direction to the slide 17. A stepped disk 23 is located upon the slide 17 above the lever 21 and rotatable upon a pivot 24; it is subdivided into five steps 25, 26, 27, 28, 29, of which the first has double the length of each of the other four. At the lower side of the stepped disk 23 are three projections 30, each of which contacts with an abutment 31 during the downward motion of the slide 17, and with a lug 32 of the guide 15 during the upward motion of the slide. The projection 30 concerned is so much held back by the abutment 31 or 32 respectively, that the stepped disk 23 is turned for one sixth of its circumference.

The lever 21 is provided with a pivot 33 which bears against the upper rim of the stepped disk 23 and determines thereby the position of height of the lever 21 relatively to the object plate 2, viz, depending upon the step (25 or 26 or 27 or 28 or 29) with which it contacts.

In the initial position of the whole arrangement and combination of parts (Fig. 1), the lever 21 bears upon the lowermost step 25 and is, thus, itself in its lowermost position, in which it is free to glide away below the arm 10 of the adjusting disk 5, when the slide 17 is downwardly moving. At this first downward motion of the slide, the stepped disk 23 will be turned, in the above described manner, for one sixth of its circumference without a change of the position of height of the lever 21, because also then the pivot 33 rests upon the step 25 which extends over two sixths of the circumference of the disk. But if the slide then again glides upwards and the stepped disk is turned a second time for one sixth of its circumference, the next step (26) gets below the pivot 33 of the lever 21 which, consequently, is lifted and gets into the path of the lever 10. This latter will, thus, be taken along at the next downward motion of the slide 17 (provided, the hand 8 does not point just to the notch 4) until the hand 8 points to the notch 4, in which moment the lever 21 will be lifted upon the next step in consequence of the further part-rotation of the stepped disk, when the lever may freely glide downwards between the arms 10 and 11. At the second upward motion of the slide 17 then taking place, the stepped disk is again rotated for one sixth of its circumference; the lever 21 glides upon the step 28 and is, thus, so much lifted that it gets into the path of the arm 11 which appertains to the adjusting disk 6. The arm 11 is, therefore, if the hand 9 of the adjusting disk 6 does not point to the notch 4, taken along with the slide 17 at the third downward motion of the same until the hand 9 and the notch 4 coincide and the lever 21 is lifted for another step by reason of another part rotation of the stepped disk under the action of the abutment 31; the lever 21 is now free to glide downwards over the arm 11.

At the third upward motion of the slide 17 the stepped disk is rotated by the abutment 32 for the last sixth of its circumference and the pivot 33 gets from the highest step down to the lowermost one, viz, 25, so that the lever 21 then re-assumes its initial position, that is the lowermost one. If the one or the other of the two stepped disks is (or if both disks are) so far turned to the right that its hand 8, or 9 respectively, lies righthand from the notch 4, the arm 10, or 11 respectively, will not be actuated when the slide 17 is downwardly moved by the lever 21 because it lies at that time below the path of motion of that lever. But when the slide moves upwards, the respective arm is taken along with it by the ledge 16 until the appertaining hand (8, or 9 respectively), points to the notch 4.

The two times repeated (i. e. three times occurring) downward and upward motion of the slide 17, as necessary for the adjustment of the lever 21 and for the rotary motion of the adjusting disks 5 and 6, as effected by said lever, the whole in the above-described manner, is produced as follows:

From the initial position illustrated in Fig. 1, the adjusting device, that is to say: the slide 17 with the lever 21 and the stepped disk 23, is downwardly moved by a finger pressure upon its ledge contrarily to the action of the spiral spring enclosed in the sleeve 19; that downward motion is continued until the ledge 16 catches behind a projection 34 of a spring-loaded check-lever 36 fulcrumed upon a pivot 35. This lever 36 is, however, generally, that is to say during all upward and downward motions ensuing, held in lifted position by a second check-lever 38 which catches over a lug 37 of the first check-lever 36, the relative position of the parts concerned being then such that the projection 34 is no more in the path of motion of the ledge 16 which latter thus, may unimpededly glide away below the projection 34. If, finally, the adjusting device has re-assumed its original position and if, then, the object-glass shutter shall again be put under tension by depressing the adjusting device, that is to say if the adjusting device is to be locked in its lowermost extreme position, the locking lever 38 is so far depressed by a lug 39 of the ledge 16 that it glides off the lug 37 of the bell-crank lever 36, whereby this latter is permitted to return into its locking position under the action of its load-spring. The ledge 16, which owing to the downward motion of the adjusting device, has got into the path of the projection 34 is, thus, held fast by this latter in its lowermost position.

The second and the third downward motion of the adjusting device 17/21/23 is effected with aid of a clock-work constructed as follows:

In a casing 40 is supported a shaft 41 which is acted on by a spiral spring 42 and may be turned by means of a key contrarily to the direction of action of that spring. Turning the shaft in the other direction is prevented by a check-gearing 44/45/46 of the usual construction, as known with clock-works, and can take place only after that gearing has been released in a certain manner. To effect this, a double-armed lever 48 fulcrumed upon a pivot 47 is provided and is connected by a so-called Bowden-cable, with the rod 18 of the adjusting device; the lever 48 actuates by a pivot 50 the releasing device for the check-gearing 44/45/46. This releasing device consists of a bipartite lever 51/52, of which the member 51 turns upon a pivot 53 of the casing 40 and is subjected to the action of a pressure spring 54, whereas the member 52 turns upon a pivot 55 of the member 51 and is loaded by a pressure spring 46. The lever member 51 is provided with a rectangular projection 57 which extends below the check-gearing 44/45/46 and releases this at the next motion of the bipartite lever 51/52 whereby the shaft 41 is freed. That motion of the lever 51/52 i. e. its first motion, occurs when the arrangement and combination of parts in question, which is under tension, (Fig. 2) is released by means of the usual releasing-wire 58. Then the end 59 of this wire depresses the lug 37 of the bell-crank lever 36, in consequence of which the projection 34 is lifted off the ledge 16 of the adjusting device which (the ledge) had been locked up to then in its lowermost position. The adjusting device now glides upwards under the action of the spring enclosed in the sleeve 19, and that motion is transmitted by the rod 18 to the wire 60 of the Bowden-cable, which now in its turn depresses, by the mediation of a push-bar 61, the right-hand arm of the two-armed lever 48, contrarily to the action of a tensile spring 62. The effect of these operations is that the left arm of the lever 48 is lifted, as is also the double-lever 51/52 by the mediation of the pivot 50, and that after that the check-gearing is released by the lug 57. Now the shaft 41 commences to rotate (contrarily to the hands of a clock, viz, with respect to the drawing) and the one or the other to two pivots 63 attached to an equal-armed lever 64 affixed to the shaft 41 takes behind the lug 45 which is located at the free end of the lever 48 and is somewhat bent. Owing to the action of the respective pivot upon that lug, the lever 48 is swung from the position Fig. 1 back into the position Fig. 2. With this exchange of the cassettes takes place, as a preparatory step for the next exposure, and, furthermore, the second downward movement of the adjusting device is effected by the mediation of the push-bar 61 and the wire 60.

When the shaft 41 and, thus, also the equal-armed lever 64 have made half a revolution, the clock-work is again locked by an elastic locking pin 66 engaging an incision 67 of a disk 68 affixed to the shaft 41, whereby the adjusting device is enabled to perform its second upward motion and to bring about the second release of the clock-work in just the same manner as above described.

Owing to the second exchange of plates thus effected and to the repeated tensioning of the object-glass shutter, the third exposure has, thus, been prepared and proceeds automatically at the now following third upward motion of the adjusting device. But at this third upward motion the clock-work is, in contradistinction to the two upward motions that preceded, not released because the double-lever 51/52 is so far lifted by the appropriately broadened end 70 of the equal armed lever 64, which (the end 70) takes below a pivot 69 of the lever 52, that the pivot 50 of the lever 48 does no more take below the lever 52 at the upward motion of this latter but glides freely upwards at the side of it (Fig. 1). Only at the rewinding of the clock-work as necessary for another complete exposure the pivot 69 will again glide off the broadened end 70 of the equal-armed lever 64 and enables, thus, the lever 52 to move back into its original position (Fig. 2) under the action of the spring 56.

In order to be sure that the exchange of the plates takes place actually only after the plate just in course of treatment has been exposed, that is to say after complete closure of the object-glass, the following device is provided:

Laterally at the object-glass plate 2 is a spring-loaded locking lever 71 having a projection 72 which extends into the path of the ledge 16 and is so located with respect to this path that, whilst the adjusting device moves upwards, said ledge is held fast shortly before the ledge arrives in its uppermost position, i. e. shortly before the release of the clock-work. Finishing its upward motion is possible for the adjusting device only by the locking lever 71 being pressed to the right whereby the projection 72 is again drawn out of the path of the ledge 16. That motion of the lever 71 is effected by the tensioning lever 73 which although being movable upon a pivot 74 of the object-glass plate, is so braked by a spring (not shown) that it can follow the motion of the adjusting device only with a certain delay. At this upward motion the tensioning lever 73 engages the lower end of the locking lever 71 and presses this latter sidewards, after which the adjusting device can continue its upward motion and can finally, release the clock-work and, thus, cause this to exchange the plates for the next part-exposure. Owing to the motion of the tensioning lever being delayed, the just-mentioned procedures are, however, possible only after the exposure has been made and the object-glass is again completely closed.

The shutter is opened, in the form of construction of the apparatus as shown by way of example, with aid of an elastic lever 75 which is connected by a pull-wire 76 with the releasing lever 77 of the object-glass and is lifted (Fig. 2) at the upward motion of the adjusting device, by the end of the ledge 16 taking below a pivot 78 of the lever 75.

The Bowden-cable arrangement illustrated in Fig. 1 and serving for closing the exchange mechanism may be arranged for pulling action instead of for pressure and may act downwards instead of upwards.

Having now described my invention, what I claim as new and desire to secure by Letters Patent of the United States is:

1. In a photographic apparatus for making photographs in natural colors by an automatic succession of part exposures corresponding to the different single colors, the combination with an object-glass, cassette-exchanging means and a clock-work for operating these means, of a rotary disk arranged in front of the object-glass and being adapted to act as shutter for it and to be adjusted for the various exposure times; and means for causing a succession of operations consisting in the shutting of the object-glass, the moving of said disk into such other position as requisite for the next part-exposure, the releasing of the clock-work, the tensioning of the shutter by the clock-work for the next part-exposure, and as many repetitions of this succession of operations as the number of the part-exposures require, substantially as described.

2. In a photographic apparatus for making photographs in natural colors by an automatic succession of part exposures corresponding to the different single colors, the combination with an object-glass, a plurality of a color-filters, cassette-exchanging means, and a clock-work for operating these means, of as many rotary disks as there are color-filters, said disks being arranged in front of the object-glass and being adapted to act as shutter for it and to be adjusted for the various exposure times; and means for causing a succession of operations consisting in the shutting of the object glass, the alternate moving of said disks into such other positions as requisite for the consecutive part-exposures, the releasing of the clock-work and the tensioning of the shutter by the clock-work for the next part-exposure, substantially as described.

3. In a photographic apparatus for making photographs in natural colors by an automatic succession of part exposures, the combination with an object-glass, a plurality of color-filters, cassette-exchanging means, and a clock-work for operating these means, of as many rotary disks as there are color-filters; a slide-like adjusting-device arranged upon the object-glass plate and being adapted to be moved upwards by spring action, and downwards by the clock-work, and to take along with it any one of said rotary disks; and means for causing a succession of operations consisting in the shutting of the object glass, the alternate moving of said disks into such other positions as requisite for the consecutive part-exposures, the releasing of the clock-work and the tensioning of the shutter by the clock-work for the next part-exposure, substantially as described.

4. In a photographic apparatus for making photographs in natural colors by an automatic succession of part exposures, the combination with an object-glass, a plurality of color-filters, cassette-exchanging means, and a clock-work for operating these means, of as many rotary disks as there are color-filters; a slide arranged upon the object-glass plate, a stepped disk arranged upon said slide and being adapted to be automatically rotated for one part rotation at each upward and downward motion of the slide, a lever so arranged as to be adapted to take any of the rotary disks with it and having a pivot supported by said stepped disk and adapted to lift the lever into another plane, substantially and for the purpose as described.

5. In a photographic apparatus for making photographs in natural colors by an automatic succession of part exposures, the combination with an object-glass, a plurality of color-filters, cassette-exchanging means, and a clock-work for operating these means, of as many rotary disks as there are color-filters; a slide arranged upon the object-glass plate, two projections provided at opposite sides of the slide, a stepped disk arranged upon said slide and having three projections located at its lower surface and being adapted to co-operate with the slide-projections, these latter serving as abutments for them and retaining the stepped disk at each slide motion so as to rotate the stepped disk for one step, substantially as described.

6. In a photographic apparatus for making photographs in natural colors by an automatic succession of part exposures corresponding to the different single colors, the combination with an object-glass, cassette-exchanging means and a clock-work for operating these means, of a rotary disk arranged in front of the object-glass and being adapted to act as shutter for it and to be adjusted for the various exposure times; a Bowden-cable connecting the adjusting device with the clock-work and being adapted to release it on the tensioned shutter being released; a slide arranged upon the object-glass plate and being shoved downwards by said clock-work after each part-exposure, substantially as described.

7. In a photographic apparatus for making photographs in natural colors by an automatic succession of part exposures corresponding to the different single colors, the combination with an object-glass, cassette-exchanging means, and a clock-work for operating these means, of a rotary disk arranged in front of the object-glass and being adapted to act as shutter for it and to be adjusted for the various exposure times; a Bowden-cable connecting the adjusting device with the clock-work and being adapted to release it on the tensioned shutter being released; a stepped disk adapted to be automatically rotated for parts corresponding to its successive steps; a lever co-operating with said stepped disk and being moved into different planes by it; a Bowden-cable connecting the adjusting device with the clock-work and being adapted to release it on the tensioned shutter being released; a slide arranged upon the object-glass plate and being shoved downwards by said clock-work after each part-exposure; a ledge at said slide; said lever being so shaped and said ledge being so arranged relatively to it that the lever is apt to co-operate with the Bowden-cable by the mediation of the ledge, substantially as described.

8. In a photographic apparatus for making photographs in natural colors by an automatic succession of part exposures, the combination with an object-glass, a plurality of color-filters, cassette-exchanging means, and a clock-work for operating these means, of as many rotary disks as there are color-filters; a slide arranged upon the object-glass plate, a stepped disk arranged upon said slide and being adapted to be automatically rotated for one part rotation at each upward and downward motion of the slide, a lever so arranged as to be adapted to take any of the rotary disks with it and having a pivot supported by said stepped disk and adapted to lift the lever into another position; an elastic locking lever so arranged as to be adapted to hold back the upwardly moving slide shortly before this latter arrives in its uppermost position; and a tensioning lever so arranged as to slowly following the slide and releasing it from the stoppage after the object-glass has again been closed, substantially as described.

9. In a photographic apparatus for making photographs in natural colors by an automatic succession of part exposures corresponding to the different single colors, the features that an exposure times adjusting device is locked in its lowermost position at the tensioning of a shutter by an elastic locking lever before the first part-exposure said lever being removed from the path of the adjusting device by a releasing wire and being secured in this position by another locking lever, substantially and for the purpose as described.

10. In a photographic apparatus for making photographs in natural colors by an automatic succession of part-exposures corresponding to the different single colors, the features that an adjusting device is provided with a projection adapted to move a locking lever out of the path of another locking lever at the time when the adjusting device is downwardly moved by hand for the first time, after which the released first-mentioned locking lever locks the said adjusting device in its lowermost position, substantially and for the purpose as described.

11. In a photographic apparatus for making photographs in natural colors by an automatic succession of part exposures corresponding to the different single colors, the features that a clock-work after having been automatically released by an adjusting device effects a double plate exchange as well as a new tensioning of the object-glass shutter, after which the said clock-work is again automatically put under tension, substantially and for the purpose as described.

12. In a photographic apparatus for making photographs in natural colors by an automatic succession of part exposures corresponding to the different single colors, the features that a clock-work is released by a double-armed lever which is moved by a Bowden-cable and then releases by the mediation of a bipartite intermediate lever said clock-work, after which a catch of the clock-work moves said lever back into its initial position and is turned a second time by said Bowden-cable and is then swung back a second time by said catch, after which the connection between the said lever and the intermediate lever, as necessary for releasing the clock-work is automatically broken, substantially as described.

13. In a photographic apparatus for making photographs in natural colors by an automatic succession of part exposures corresponding to the different single colors, the features that a clock-work is released by a double-armed lever which is moved by a Bowden-cable and then releases by the mediation of a bipartite intermediate lever said clock-work, after which a catch of the clock-work moves said lever back into its initial position and is turned a second time by said Bowden-cable and is then swung back a second time by said catch, after which the connection between the said lever and the intermediate lever, as necessary for releasing the clock-work is automatically broken; the said catch consisting of an equal-armed lever, whose arms take, by means of a pivot at each arm, behind a projection of the said lever and move it back from its releasing position into its initial position, after which the clock-work is automatically checked, but is instantly thereafter released by the subsequent motion of that lever, as set forth.

14. In a photographic apparatus for making photographs in natural colors by an automatic succession of part exposures corresponding to the different single colors, the features that a clock-work is released by a double-armed lever which is moved by a Bowden-cable and then releases by the mediation of a bipartite intermediate lever said clock-work, after which a catch of the clock-work moves said lever back into its initial position and is turned a second time by said Bowden-cable and is then swung back a second time by said catch, after which the connection between the said lever and the intermediate lever, as necessary for releasing the clock-work is automatically broken; one arm of said catch having a supporting surface elongated contrarily to its direction of motion and is adapted to take below a pivot of the said bipartite intermediate lever and to lift this after the last part-exposure, whereby the connection between it and the other lever is broken.

In testimony whereof I affix my signature.

HERMANN DIERNHOFER.